Nov. 27, 1934.     H. J. ENNIS     1,982,136
COMB
Filed Feb. 3, 1934
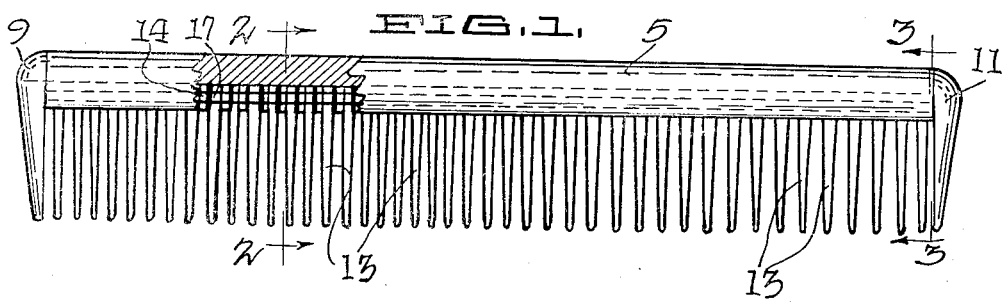
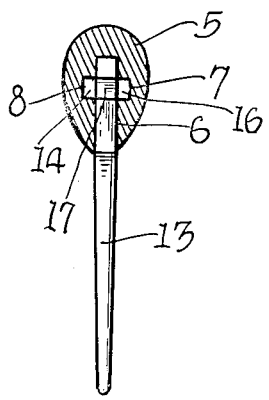
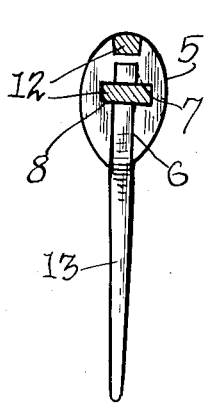
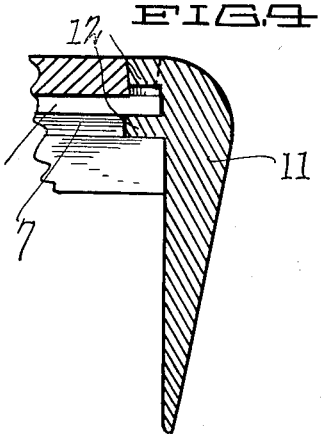
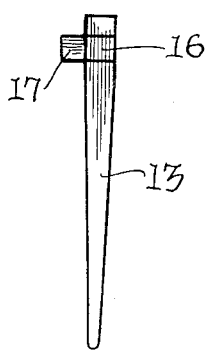
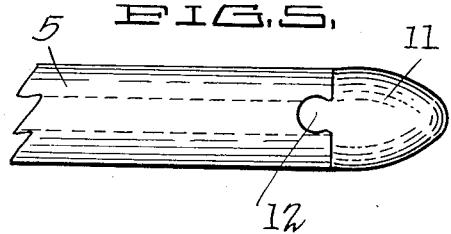
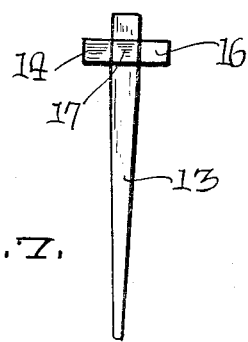
INVENTOR
HARRY J. ENNIS
BY Victor J. Evans & Co.
ATTORNEYS.

Patented Nov. 27, 1934

1,982,136

UNITED STATES PATENT OFFICE 1,982,136

COMB

Harry J. Ennis, Los Angeles, Calif.

Application February 3, 1934, Serial No. 709,655

1 Claim. (Cl. 132—16)

This invention relates to improvements in combs and has particular reference to a comb wherein the teeth may be removed for cleaning or replacement.

Another object of the invention is to produce a device which is economical to manufacture.

A further object is to produce a device which is strong in its construction, and a comb which will have all the appearances of an ordinary comb.

In the accompanying drawing forming a part of this specification and in which like numerals are employed to designate like parts throughout the same, Fig. 1 is a side elevation of a comb constructed in accordance with my invention, Fig. 2 is a cross sectional view on the line 2—2 of Fig. 1, Fig. 3 is a cross section taken on the line 3—3 of Fig. 1, Fig. 4 is an enlarged fragmentary detail cross sectional view of one end of the comb, Fig. 5 is a top plan view of Fig. 4, Fig. 6 is a side elevation of one of the teeth removed from the comb, and Fig. 7 is an edge elevation of Fig. 6.

Combs are generally formed of molded material and when used upon the hair, often become badly soiled and extremely difficult to clean, particularly if the teeth are fine. Also it is true that the teeth of a comb often become broken and thus ruin an otherwise good comb. Applicant has devised a comb wherein the teeth of the comb may be removed for cleaning or replacement.

In the accompanying drawing, particularly referring to Fig. 1, the numeral 5 designates the back of a comb in which is formed a slot 6 which communicates with side slots 7 and 8 (see Fig. 2).

I preferably employ a closed end formed integral with the back 5, as illustrated at 9 and provide a removable end 11 at the opposite extremity of the back. This end 11 has a dove-tail connection 12 (see Fig. 5). The teeth of my comb are best illustrated in Figs. 6 and 7, the numeral 13 referring to the tooth proper which has side wings 14 and 16 formed integral therewith, and a spacer 17.

In assembling my comb, I place the teeth in the comb, as illustrated in Fig. 1, by first removing the end 11 and sliding a plurality of teeth in the slot 6 so that the side wings 14 and 16 enter the side slots 7 and 8, respectively. This causes the spacer 17 to abut the next adjacent tooth and properly space the teeth one from the other. After the back has been filled with teeth the end 11 is attached through its dove-tail connection.

It will thus be seen that I have produced a device which will accomplish the above set forth objects.

It is to be understood that the form of my invention herewith shown and described is to be taken as a preferred example of the same and that various changes relative to the material, size, shape and arrangement of parts may be resorted to without departing from the spirit of the invention or scope of the subjoined claim.

Having thus described my invention, I claim:—

In a comb, a back portion, said back portion having a slot formed therein, side slots communicating with said first mentioned slot, an end portion having a dove-tailed connection with said back portion, and removable teeth positioned in said slot, said teeth having wings entering said side slots.

HARRY J. ENNIS.